Feb. 8, 1966  D. W. HOLDSWORTH  3,234,462
POLYMERIC TESTING BY DIPOLE ORIENTATION
Filed Aug. 16, 1961

INVENTOR.
Dennis W. Holdsworth
BY
Roberts, Cushman & Grover
ATT'YS 3,234,462
POLYMERIC TESTING BY DIPOLE ORIENTATION
Dennis W. Holdsworth, Lincoln, Mass., assignor to Comstock & Wescott, Inc., Cambridge, Mass., a corporation of Massachusetts
Filed Aug. 16, 1961, Ser. No. 131,907
6 Claims. (Cl. 324—71)

This invention relates to a method and apparatus for determining and controlling various characteristics of polymeric materials.

In the manufacture of polymerized plastics in various forms it is typically desired, during the various stages of processing, to determine the extent to which the curing of the plastic has progressed. Attempts have been made to relate the extent of cure to various, more easily measured characteristics of the plastics but without any considerable success as related to industrial applications.

Objects of the present invention accordingly are to provide a novel and simple method for determining the state of cure or polymerization of a wide variety of plastic materials. Further objects are to provide such a method which yields accurate and reproducible results, which is easily applied to continuous industrial manufacturing processes, which may be used to control such processes and which does not harm or require physical contact with the plastic being tested. Still further objects of the invention are to provide apparatus for the practice of the method, which apparatus is simple, accurate and reliable and which, to an appreciable extent, incorporates conventional components and is therefore relatively inexpensive.

The invention contemplates applying a unidirectional electric field of predetermined strength across a sample of the polymeric material. It has been found that the field will induce a back electromotive force across the sample and that the rate at which this back E.M.F. is developed is related to the degree of polymerization of the sample. It has also been found that this back E.M.F. decays only relatively slowly after the removal of the electric field and that the rate of this decay is also related to the degree of polymerization.

This general effect is apparently due to the presence of electric dipoles within the polymeric mass which can be reoriented against the restraining molecular forces by a strong electric field. The reorientation is viscously damped and the viscosity is apparently the factor which is directly related to the degree of polymerization of the material.

Accordingly, the degree of polymerization, by influencing the internal viscosity of the mass, affects the mobility of these dipoles and the corresponding rate at which the back E.M.F. is developed. Likewise the degree of polymerization affects the rate at which the internal molecular forces of the material can return the dipoles to their original, randomly distributed orientations.

If the field is applied for a sufficient length of time the reorientation of the dipoles will approach a final state which is substantially independent of the viscosity of the mass and depends only on the strength of the applied electric field. The back E.M.F. correspondingly approaches a value which is related to the number of dipoles present in the mass and reoriented by the field. Knowledge of the number of dipoles present is useful of itself in determining the nature of the polymeric mass and, if other conditions are constant, is useful in determining the quantity of polymeric material present, e.g., determining the thickness of a plastic coating.

The practice of the invention thus involves determining characteristics of a sample of polymeric material by applying a unidirectional electric field of predetermined strength across the sample and measuring the back electromotive force thereby induced across the sample. The back electromotive force can be measured either coincidently with the application of the electric field or by quickly removing the field and measuring the potential persisting across the sample.

In one aspect the invention contemplates measuring this back electromotive force as a function of time, the rate at which the back electromotive force changes in response to a given set of external conditions being an indication of the degree of polymerization of the sample.

In another aspect the invention contemplates measuring the maximum back electromotive force which can be induced by a given electric field, this maximum being an indication of the quantity of polymeric material present in the sample.

In a practically important aspect of the invention, the persisting potential across a sample is measured without physically contacting the sample by modulating the static field of the persisting potential with a device known as a field modulator. This device is an arrangement which alternately shields and exposes a capacitor plate to the sample thereby to capacitively induce on the plate an easily amplified and measurable alternating current voltage.

In a further practically important aspect the invention contemplates that means for performing the various successive steps of the method be spaced along the path of a continuously manufactured web of polymeric material and that there be included means, responsive to the rate of decay of the persistent potential for controlling the degree of curing applied to the web at some point previous to the detecting apparatus.

A more complete understanding of the invention may be had from the following detailed description referring to the accompanying drawings in which.

Figure 1:
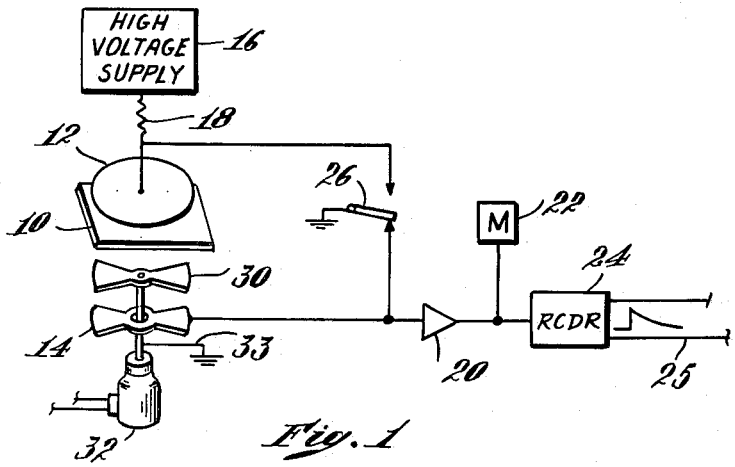
FIG. 1 shows polymerization testing apparatus in diagrammatic form.

Referring now to FIG. 1 a sample 10 of polymeric material is suspended between two fixed capacitor plates 12 and 14. The upper plate 12 is connected to a high voltage direct current supply 16 through a current limiting resistor 18. A suitable voltage for many plastic materials is 5,000 volts. The lower plate 14 is connected to a sensitive amplifier 20 whose output signal is in turn fed to a meter 22 and to a signal recorder 24. By means of a grounding switch 26 either the upper capacitor plate 12 or the input to the amplifier 20 may be selectively grounded. The lower capacitor plate 14 is further provided with a rotatable shield 30 which can be continuously driven by the synchronous motor 32. The lower capacitor plate 14 and the shield 30 are both of a butterfly configuration so that as the shield 30 rotates, the capacitor plate 14 is alternately shielded from and exposed to any electric field emanating from the direction of the sample 10, the shield 30 being grounded as at 33.

The operation of the device is as follows. With the switch 26 in the position shown, the high voltage supply 16 creates a strong electric field between the upper capacitor plate 12 and the lower plate 14 with its associated shield 30, these latter elements both being at ground potential. This electric field stresses the polymeric material as explained previously thereby inducing a back electromotive force across the sample. Reversing the position of the switch 26 instantly removes the applied electric field by grounding the upper capacitor plate 12 and simultaneously opens the input to the amplifier 20 to any signal originating in the lower capacitor plate 14.

A persisting potential on the surface of the sample 10 will create its own correspondingly weak electric field between the capacitor plates 12 and 14. Since the direct current voltage or static charge thereby capacitively induced on the plate 14 would leak off or be disturbed by any conductive contact, and hence would be difficult to measure directly by D.C. amplification, the rotating shield 30 causes the plate 14 to be alternately shielded from and exposed to the field emanating from the sample 10 thereby capacitively inducing on the plate 14 a corresponding alternating current signal voltage which, though also of small magnitude, may be more easily discerned and amplified. For this purpose the amplifier 20 preferably contains filters for rendering the gain of the amplifier selectively sensitive to input signals of a frequency corresponding to the speed of rotation of the shield 30. The amplitude of the amplified signal is then indicated continuously at the meter 22 and is recorded, as on a paper strip 25, by the recorder 24.

Figure 3:
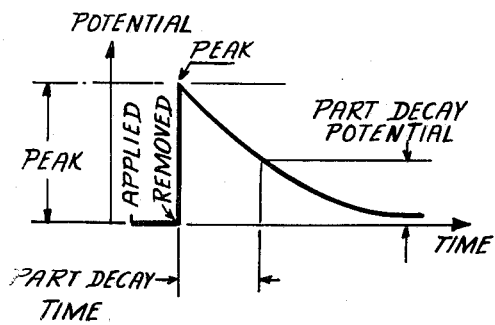
FIG. 3 illustrates the time characteristic of the persistent surface potential across a previously electrically stressed polymeric layer.

A representation of the amplitude of the output signal obtained from the amplifier 20 is shown in FIG. 3. During the period in which the strong electric field is applied to stress the sample 10, the output signal remains at zero because the input of the amplifier is grounded by the switch 26 so as to prevent overloading of the amplifier by the high voltage supply 16. After the switch 26 is thrown to its opposite position, however, the output signal rises quickly to a peak level which is representative of the potential on the surface of the sample 10. In that, for a given set of stressing conditions, the magnitude of this peak apparently depends upon the number of dipole elements and hence upon the quantity of polymeric material contained in the sample 10, this measured peak potential is an accurate indication of the thickness of the sample sheet. As time progresses, the output signal decays as shown. The rate at which this decay occurs is a measure of the degree of cure of the polymeric sample, the faster the decay the less complete is the polymerizing process.

Figure 4:
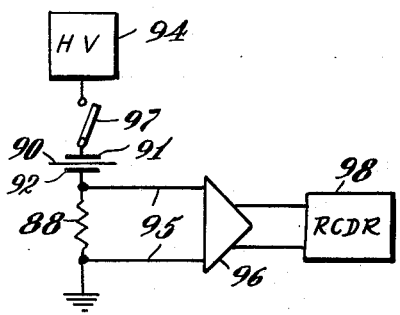
FIG. 4 shows another polymerization testing apparatus.

FIG. 4 shows alternative apparatus for determining the behavior of the back E.M.F. and hence the state of cure of the polymeric material. In this embodiment a sheet sample 90 is positioned between two plates 91 and 92. The plate 91 is grounded through a resistor 88 and the other plate 92 is connected to at high voltage direct current supply 94, through a switch 97. The values of resistance and capacitance in the charging circuit are selected to provide as short an R-C time constant as is compatible with developing a measurable IR drop across the resistor 88. The input leads 95 of a direct current amplifier 96 are connected across the resistor 88 and the output signal from the amplifier is connected to a recorder 98.

When the sample 90 is subjected to an electric field a back E.M.F. is developed across the sample as in the previous example. The growth of this back E.M.F. causes a measurable quantity of current to be drawn through the resistor 88 and thereby induces a departure from the normal charging characteristics of the capacitor formed by the plates 91 and 92. Typically the charging time of the capacitor 91, 92 is so short as compared with the period over which the back E.M.F. develops, that the two effects may be easily distinguished. For example, when the switch 97 is closed the capacitor 91, 92 is charged by current flowing through the resistor 88. With no sample between the plates the current across the resistor rises to a maximum and decays towards zero in a normal charging period of negligible duration. However, if a polymeric sample is placed between the plates, the application of the high potential causes a relatively slow growth of a back E.M.F. attributable to the reorientation of the component dipoles. Presumably owing to the viscosity of the plastic, the reorientation and corresponding growth of the back E.M.F. continues for a period much longer than the normal capacitor charging period. During this longer period appreciable current continues to flow through the resistor 88 and its level decays only relatively slowly. Because the normal charging period is substantially instantaneous in comparison, a recorded measurement of the decaying current level corresponds closely to the rate of growth of the back E.M.F., that is, as the back E.M.F. approaches its maximum, the current level decays slowly toward zero in a manner somewhat similar to the decay of the persisting potential in the previously described example. The rate of this decay is likewise a measure of the degree of polymerization of the sample.

Figure 2:
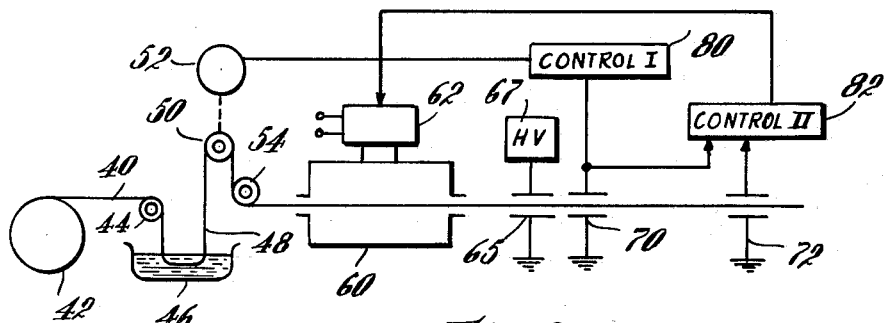
FIG. 2 shows a control system.

FIG. 2 illustrates a continuous manufacturing process for coating a fabric web with a layer of polymeric plastic in which the method according to the invention is used to control both the coating and the curing processes. The fabric backing 40 is taken from a roll 42 and after passing over rollers 44 proceeds in the form of a depending loop 48 through a tank 46 of the coating plastic. The size of the loop 48 and hence the time over which any particular part of the fabric 40 is immersed in the tank 46, may be adjusted by raising or lowering the roller 50 as by the motor control 52. From the tank 46 the web of fabric is conducted past the roller 54 into a curing oven 60 whose temperature is controlled by the heater 62, the degree of curing experienced by the plastic being directly affected by the temperature in the oven. From the oven the web proceeds between but without touching a pair of fixed plates 65 across which is applied a predetermined high voltage from the source 67. This high potential stresses the plastic coating as in the example of FIG. 1, the time of exposure being dependent upon the rate of motion of the material. The web next passes between the plates of a sensing capacitor 70 which is essentially similar to the sensing capacitor plate 14 of FIG. 1 preferably including the rotating shield (not shown). Spaced along the movement of the web from the first sensing capacitor 70, there is provided a second sensing capacitor 72 which is also essentially similar, the spacing between the two capacitors being chosen to correspond, for a given web speed, to a delay suitable for determining the rate of decay of the persistent potential across the polymeric coating. The first capacitor 70 thus produces a peak potential signal and the second capacitor 72 produces a subsequent, decayed potential signal. The signals obtained from the sensing capacitors are utilized by suitable control units 80 and 82. The first control unit 80 includes conventional apparatus responsive to the peak potential signal obtained from the sensing capacitor 70, for driving the motor 52 so as to regulate the size of the depending loop 48 thereby to control the thickness of the plastic coating. The control thus exercised is essentially that of a feedback loop.

A portion of the signal from the sensing capacitor 70 is also fed into the second control unit 82 as is the decayed potential signal from the second sensing capacitor 72. This control unit includes apparatus responsive to the difference in the amplitude of the two signals, for regulating the heat supplied to the oven 60 so as to control the degree of cure of the completed polymeric coating. This control is thus a second feedback loop responsive to a second variable characteristic of the manufactured web. An alternative, similarly effective control over the curing would be to vary the speed at which the material passes through the oven.

It should be understood that this disclosure is for the purpose of illustration only and that the present invention includes all modifications and equivalents falling within the scope of the appended claims.

I claim:

1. The method of determining characteristics of a sample of polymeric material comprising applying a relatively strong unidirectional electric field across said sample, removing said applied field without short circuiting the potential then existing across said sample, and alternately shielding and exposing a capacitor plate to the electric field of the persisting potential thereby induced across said sample, and measuring the alternating current voltage thereby induced on said capacitor plate.

2. The method of measuring the degree of polymerization of a layer of polymeric material comprising applying a strong unidirectional electric field across said layer, removing said applied field, alternately shielding and exposing a capacitor plate to the electric field of the persisting potential thereby induced across said layer, and measuring the amplitude of alternating current voltage thereby induced on said capacitor plate as a function of time, the percentage rate of decay of the voltage induced on said capacitor plate being an indication of the degree of polymerization of the polymeric material in said layer.

3. Apparatus for determining characteristics of a sample of polymeric material comprising means including a pair of capacitor plates between which said sample is suspended for selectively applying a strong unidirectional electric field across said sample and then removing said applied field without short circuiting the potential then existing across said sample, a capacitor plate adjacent said sample, means for alternately shielding and exposing said capacitor plate to an electric field emanating from said sample, and alternating current amplifying means connected to said capacitor plate for producing a signal which is an alternating current representation of the amplitude of the persisting potential existing across said sample.

4. Apparatus for controlling the thickness of a layer of polymeric material on a moving web comprising, stressing means for applying a strong unidirectional electric field across said moving web, detecting means spaced along the path of said web from said stressing means for measuring a persisting potential existing across said moving web and means, responsive to the voltage measured by said detecting means, for adjusting the thickness of the layer of polymeric material.

5. Apparatus for controlling the curing of a moving web including a layer of polymeric material comprising means for adjustably curing said polymeric material, stressing means for applying a strong unidirectional electric field across said moving web, first detecting means spaced along the path of said web from said stressing means for measuring a peak persisting potential existing across said web, second detecting means spaced a predetermined distance along the path of said web from said first detecting means for measuring a decayed persisting potential across said web, and means, responsive to the difference in voltages measured by the respective detecting means, for adjusting the extent of curing applied to said polymeric material.

6. Apparatus for controlling the thickness and curing of a moving web including a layer of polymeric material comprising means for applying a strong unidirectional electric field across said moving web, first detecting means spaced along the path of said web from said stressing means for measuring the potential persisting across said web, second detecting means spaced a predetermined distance along the path of said web from said first detecting means for measuring the potential persisting across said web, means, responsive to the voltage measured by said first detecting means, for adjusting the thickness of said layer of polymeric material, and means, responsive to the difference in voltages measured by said first and second detecting means, for adjusting the amount of curing applied to said polymeric material.

References Cited by the Examiner
UNITED STATES PATENTS

| 1,652,538 | 12/1927 | Marbury | 324—54 |
| 2,701,336 | 2/1955 | Anderson | 324—54 |
| 2,804,592 | 8/1957 | Biskeborn | 324—61 |
| 2,993,165 | 7/1961 | Jauch | 324—32 |

OTHER REFERENCES

Gutmann: 20 Rev. Mod. Phys. 457 (1958), pages 457 and 470.

WALTER L. CARLSON, *Primary Examiner.*